Figure 4:
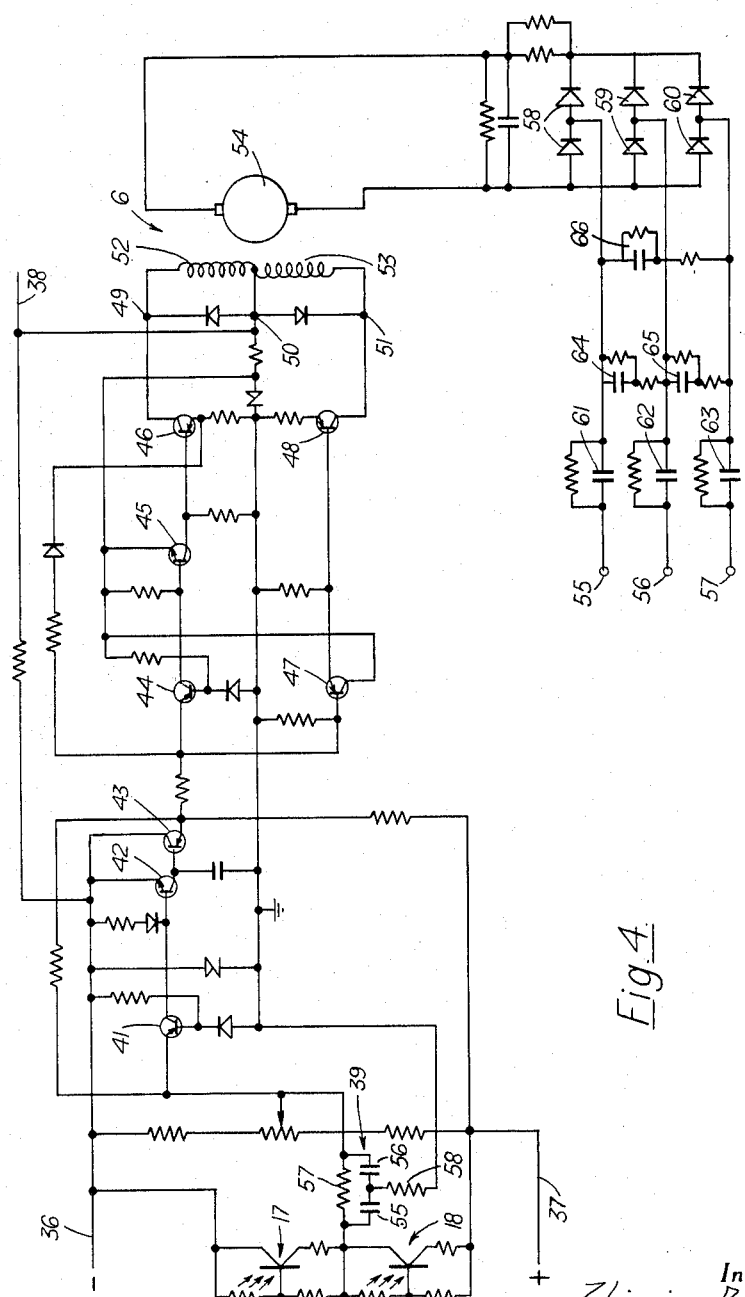

Feb. 8, 1966  Z. BONIKOWSKI  3,233,397
APPARATUS FOR CONTROLLING THE TENSION IN A FLEXIBLE
MATERIAL AS IT IS BEING WOUND ONTO OR
UNWOUND FROM A DRUM
Filed July 2, 1963  11 Sheets-Sheet 1
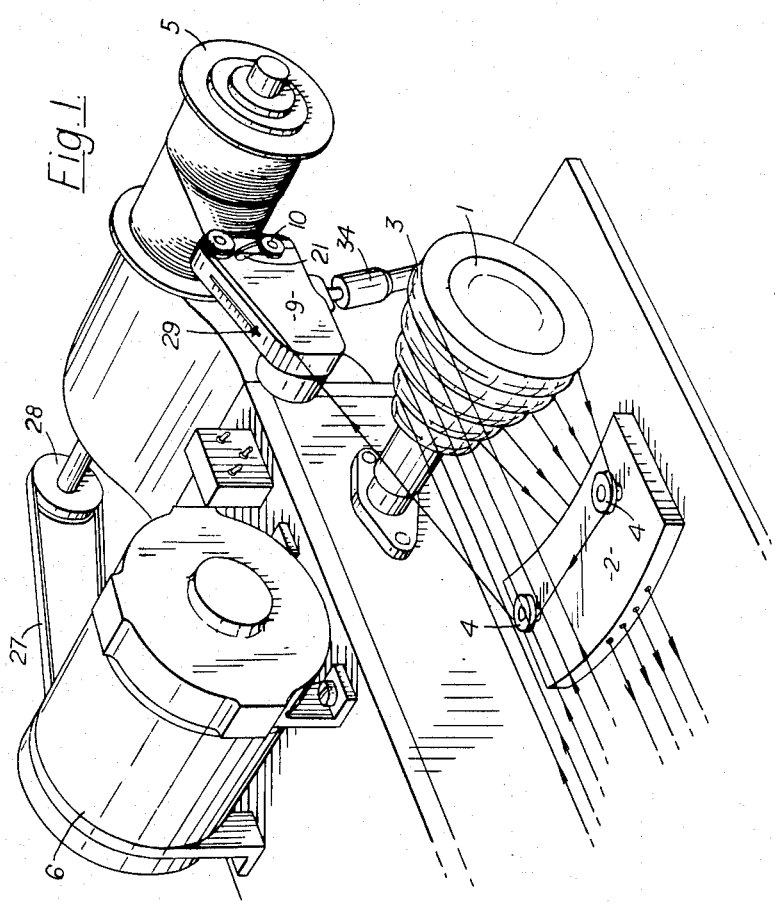
Inventor
Zbigniew Bonikowski
By Webb Mackey
and Burden Attorneys

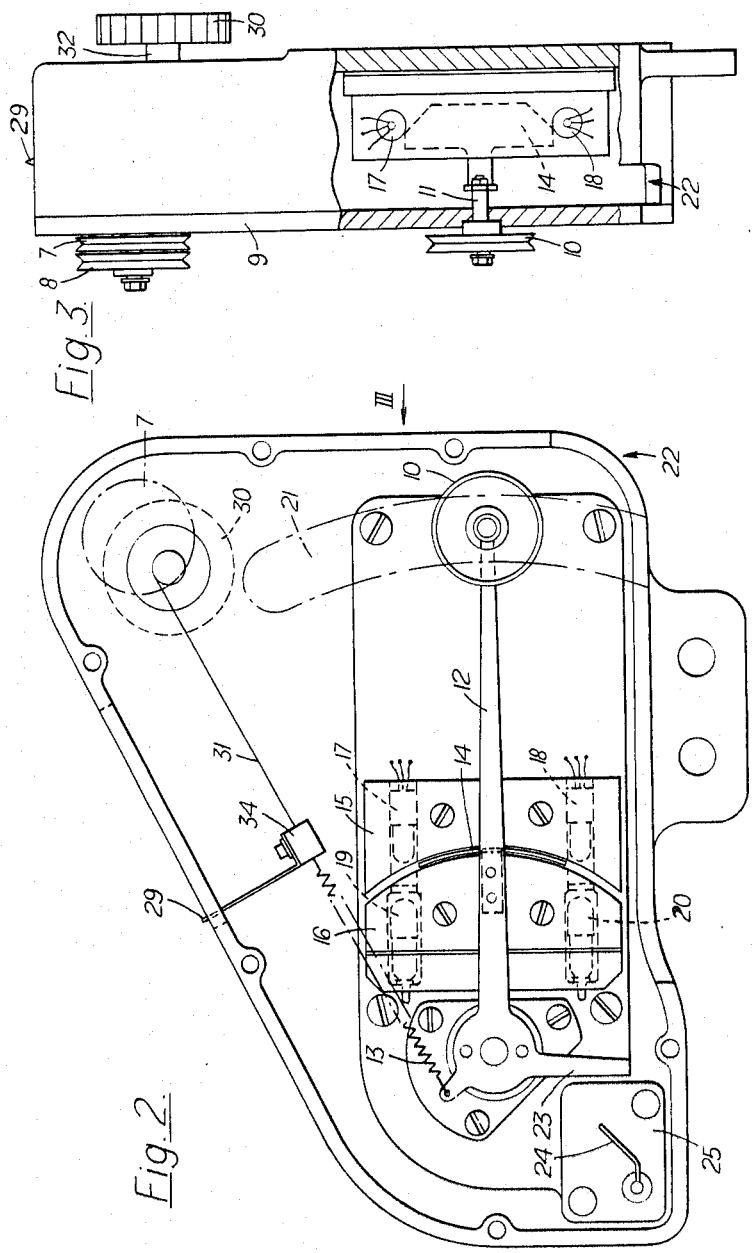

Feb. 8, 1966 Z. BONIKOWSKI 3,233,397
APPARATUS FOR CONTROLLING THE TENSION IN A FLEXIBLE
MATERIAL AS IT IS BEING WOUND ONTO OR
UNWOUND FROM A DRUM
Filed July 2, 1963 11 Sheets-Sheet 8
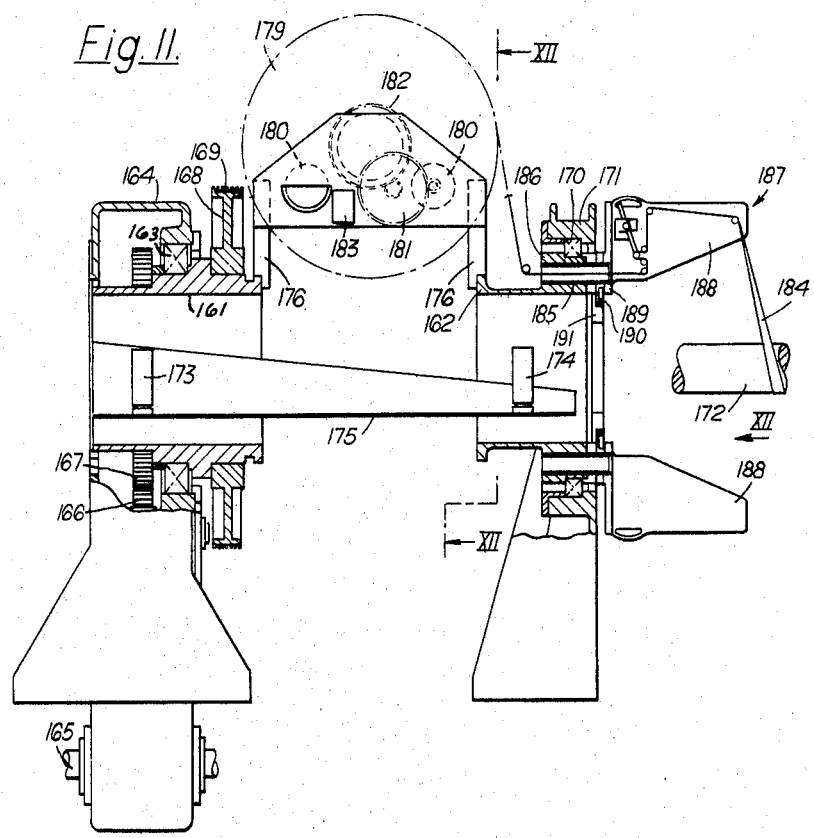
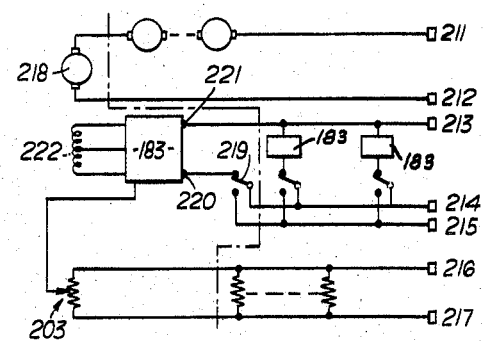
Inventor
Zbigniew Bonikowski
By Webb, Mackey
and Burden Attorneys Feb. 8, 1966            Z. BONIKOWSKI           3,233,397
APPARATUS FOR CONTROLLING THE TENSION IN A FLEXIBLE
MATERIAL AS IT IS BEING WOUND ONTO OR
UNWOUND FROM A DRUM
Filed July 2, 1963                      11 Sheets-Sheet 9
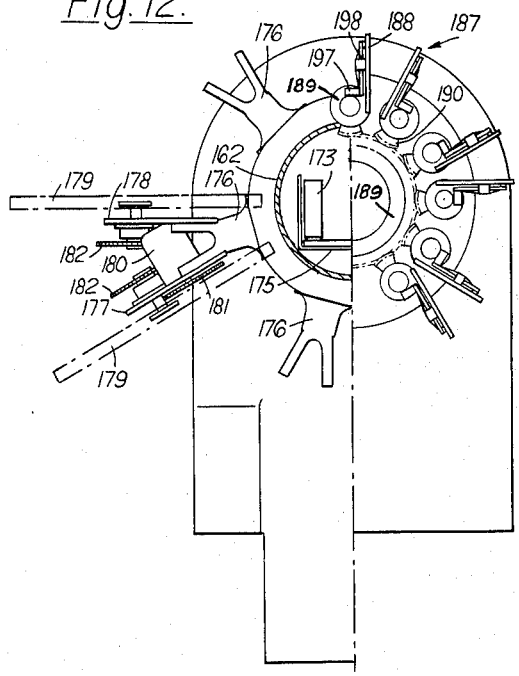
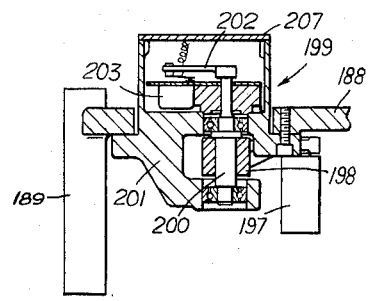
Inventor
Zbigniew Bonikowski
By Webb, Mackey
and Burdick Attorneys

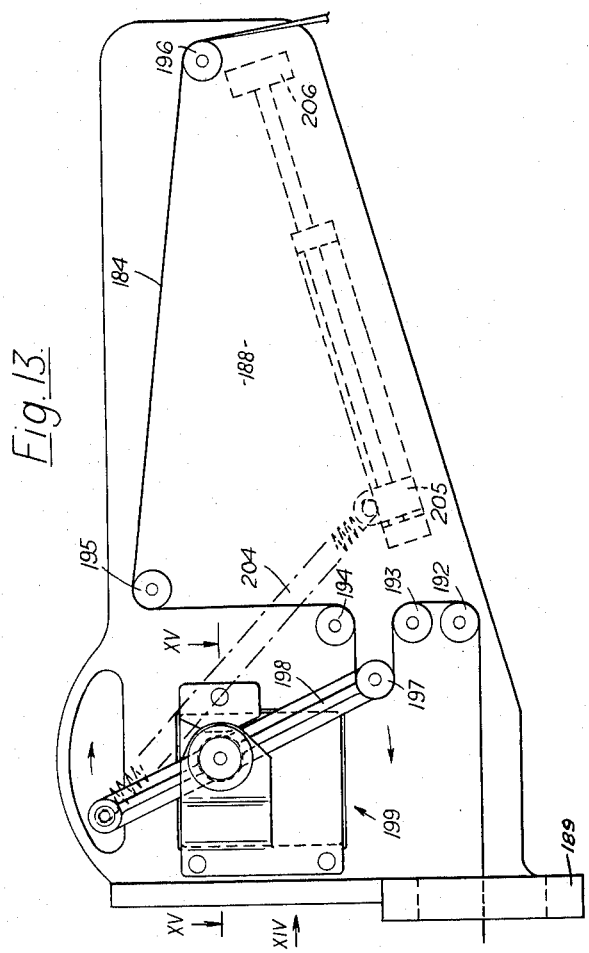
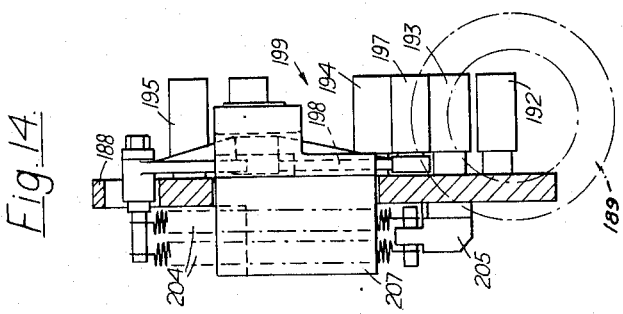

United States Patent Office 3,233,397
Patented Feb. 8, 1966

3,233,397
APPARATUS FOR CONTROLLING THE TENSION IN A FLEXIBLE MATERIAL AS IT IS BEING WOUND ONTO OR UNWOUND FROM A DRUM
Zbigniew Bonikowski, Ealing, London, England, assignor to British Insulated Callender's Cables Limited, London, England, a British company
Filed July 2, 1963, Ser. No. 292,376
Claims priority, application Great Britain, July 5, 1962, 25,817/62
12 Claims. (Cl. 57—13)

This invention relates to apparatus for controlling the tension in a flexible material as it passes between means for driving the flexible material and a drum on to which the material is being wound or from which it is being unwound. The means for driving the flexible material may be a capstan or similar driving device and may be incorporated in apparatus for processing the flexible material e.g. a wire drawing apparatus or an enamelling machine. Alternatively, it may be a drum on to which the flexible material is being wound. The term "drum" is used in this specification in its broadest sense as including not only the cylindrical barrels (of circular cross-section) of spools, reels, etc. but also non-cylindrical members and frames, e.g. of rectangular or polygonal cross-section, on which it may be desired to wind flexible materials at constant tension.

The invention is especially but not exclusively applicable to very thin and light flexible materials, for example, very fine wires, thin paper tapes and magnetic recording tapes. An object of the invention is to provide a control means which limits within a small range the tension changes due to changes to speed of the flexible material.

The apparatus in accordance with the invention comprises a reversible electric motor driving, either directly or through a gear train, the drum from which or on to which the flexible material is being wound; a multi-stage high gain electronic amplifier for supplying either the armature current or the field current of the motor or both; a sensing device responsive to changes in the tension of the flexible material in its path between the drum and the means for driving the flexible material, which device varies, in accordance with the tension, the value of an impedance controlling the amplifier input; and a resistance/capacitance stabilisation network, designed to inhibit hunting in the system, connected in the amplifier input circuit. The arrangement is such that when the impedance is at an optimum value corresponding to the desired tension in the flexible material, the amplifier supplies field or armature current (or both) to drive the motor in an appropriate direction and at a sufficient torque to maintain that tension in the material and when the tension changes, causing the impedance to vary from the optimum value, the armature or field current supplied by the amplifier varies in such a way as to restore the tension to the desired value and, if necessary to attain this end, in such a way as to drive the motor in the opposite direction. When the amplifier supplies both the field and the armature current of the motor either the field winding or the armature of the motor is connected across a bridge rectifier in series with the armature or field, as the case may be, in such a way that when the amplifier output is reversed the motor will reverse. When the amplifier supplies the armature current only the field current is obtained from a source such that substantially constant current passes through the field windings or alternatively a permanent magnet motor may be used. When the amplifier output supplies the field current only, the armature current is derived from a substantially constant current power supply.

The term "high gain amplifier" means an amplifier having a power output sufficient to provide the whole of the armature or field current to drive the reversible motor and yet having a low current input that can be controlled by a simple potentiometer or other variable impedance, that is to say, a potentiometer that can be actuated through the desired range under the action of a very small force exerted on it by the flexible material. The power gain of the amplifier will normally not be less than $10^3$ but is preferably greater than $10^6$.

An essential feature of the invention is that the means for driving the flexible material is capable of exerting a greater longitudinal driving or braking force on the flexible material than is the reversible motor and the supply or take-up drum driven thereby. A further essential feature of the invention is the use of an amplifier having input characteristics such that its input circuit can include a stabilisation network and having a power output that can supply substantially the whole of the field or the armature current of the reversible motor. Other important preferred features of the amplifier are that it shall be as simple as possible, in that it utilises the minimum number of components, and that its circuit shall be such that one input terminal can be earthed in order to reduce stray pick up of random noise signals.

An important preferred feature of the sensing device is that it should be capable of accumulating a length of the flexible material sufficient to compensate for any delay in the response of the reversible motor to changes in the speed of the material. Preferably the sensing device is also so designed that it applies a substantially constant force to the flexible material, whatever the amount of the material accumulated by it within its predetermined limits of operation.

The amplifier is preferably a transistor amplifier and preferably has two output circuits, one of which supplies current to the motor when the impedance in its input circuit is above a predetermined value and the other of which supplies current to the motor when the impedance is below the optimum value. The predetermined value will vary from the optimum value referred to above by an amount dependent on the tension desired in the flexible material. These two output circuits are preferably connected to separate field windings or separate parts of the same field winding of the motor, and are always connected in such a way that when one circuit is effective the armature will tend to rotate in one direction and when the other circuit is effective the armature will tend to rotate in the opposite direction. For example, when the motor is a split field motor, the two separate output circuits of the amplifier may have a common terminal connected to a common terminal of the field windings and the output between the common terminal of the amplifier and one other terminal is positive with respect to the common terminal when the resistance in the amplifier input circuit is above the predetermined value and the output between the common terminal and the other terminal of the amplifier output negative when the resistance in the amplifier input circuit is below the predetermined value. Commutation diodes are preferably connected across each output circuit to prevent over voltage caused by inductance in the load circuits.

Alternatively, an amplifier with a bi-directional output from a single pair of output terminals may be used, the amplifier circuit being such that when the resistance in the input circuit is above the predetermined value, the output of the amplifier is positive and when it is below, the output is negative; such an amplifier can be used with an electric motor having a single field winding.

The means for sensing the tension in the flexible material is preferably a jockey pulley around which a loop of the flexible material passes, the support for the pulley being spring biased in a direction tending to increase the length of the loop and being mechanically coupled to the variable impedance in the amplifier input circuit. The term "loop" includes both closed and open (e.g. U-shaped) loops. The force exerted by the biasing spring is adjustable to enable the apparatus to be set to maintain the desired tension in the flexible material and the biasing means is preferably designed to exert a substantially constant force on the support for the pulley over the whole of the normal range of its movement.

The invention will be further illustrated by descriptions by way of example with reference to the accompanying drawings of a number of examples of apparatus for winding and unwinding various forms of flexible material. In the drawings:

FIGURE 1 is a perspective view of the take-up end of a wire drawing machine.

Figure 5:
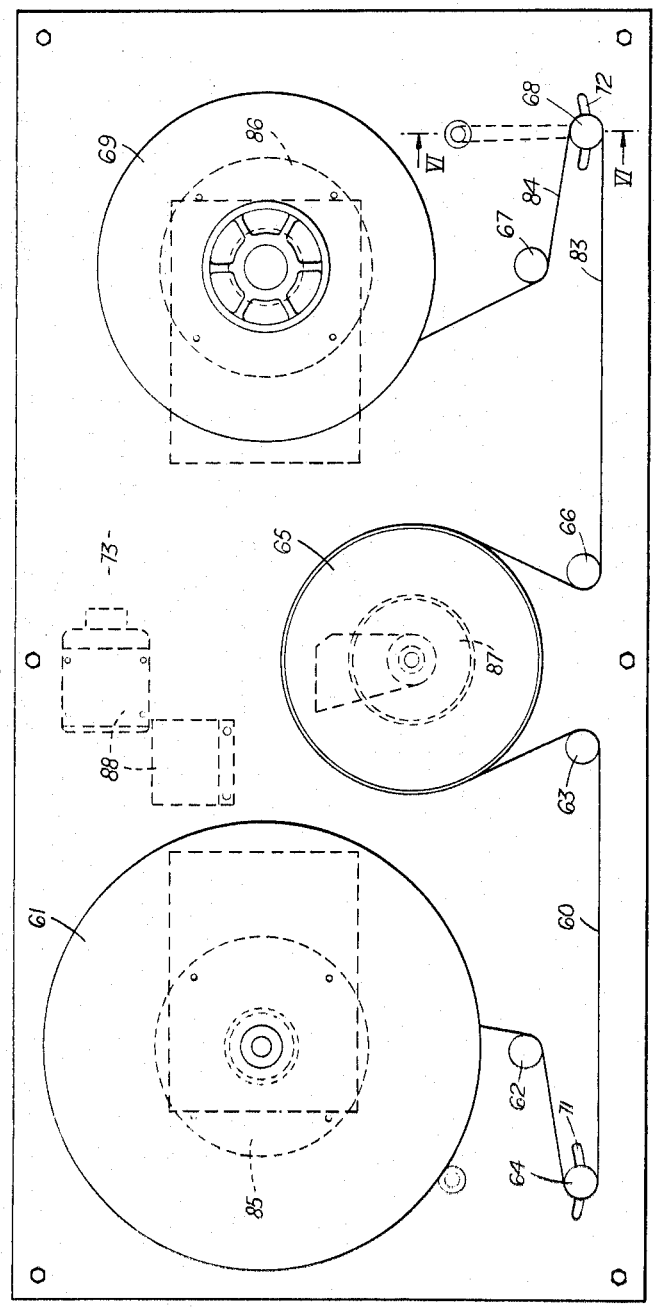
Figure 6:
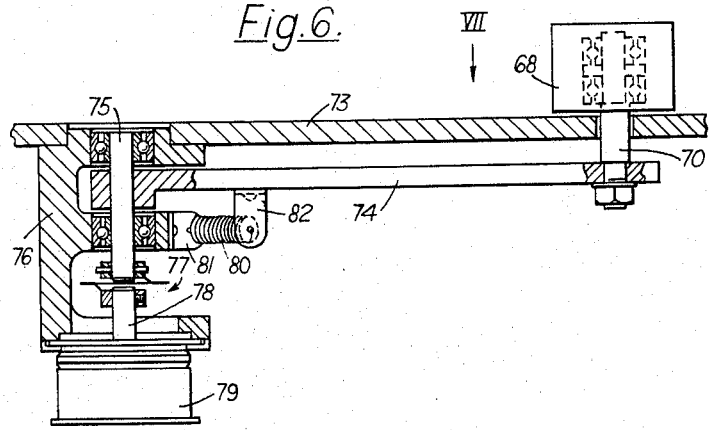
Figure 8:
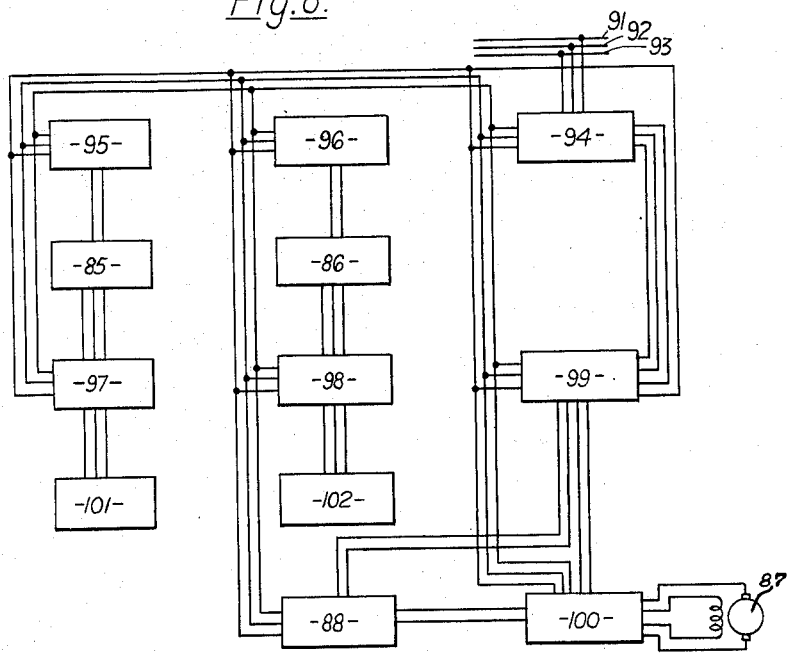
Figure 7:
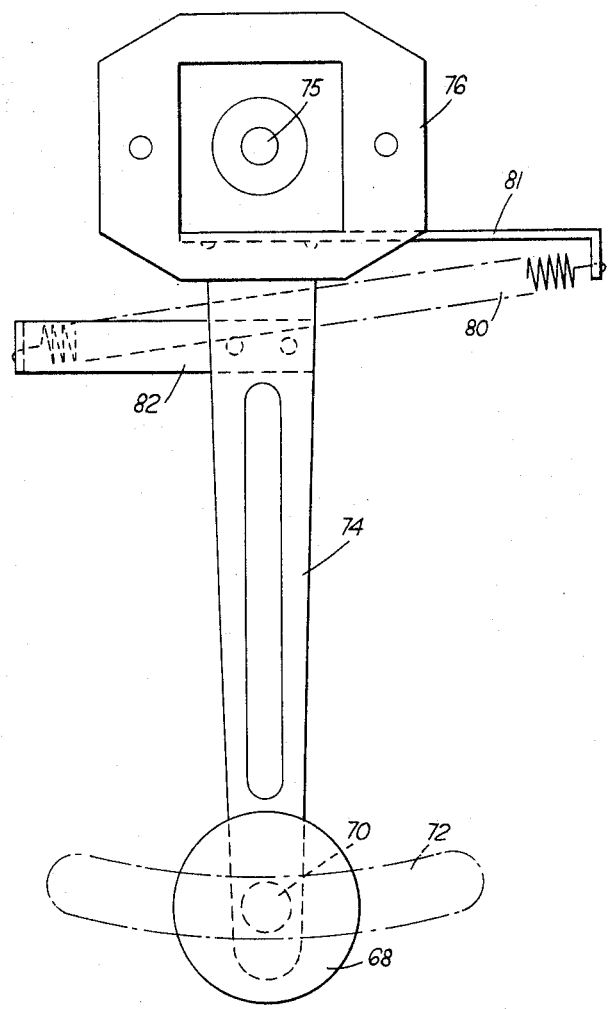
Figure 9:
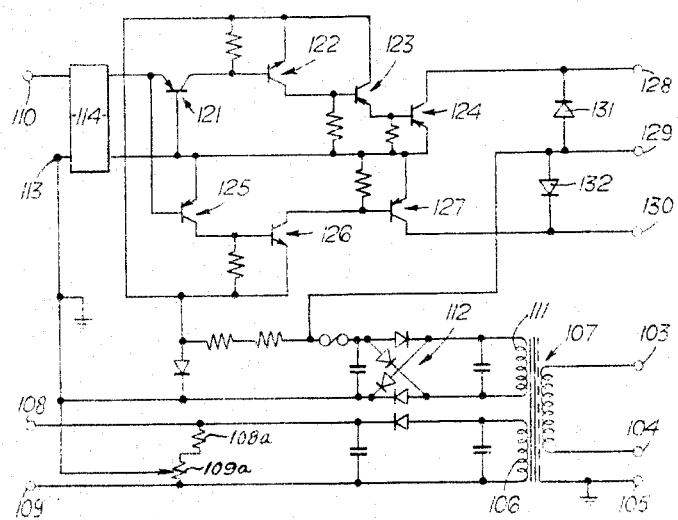
Figure 10:
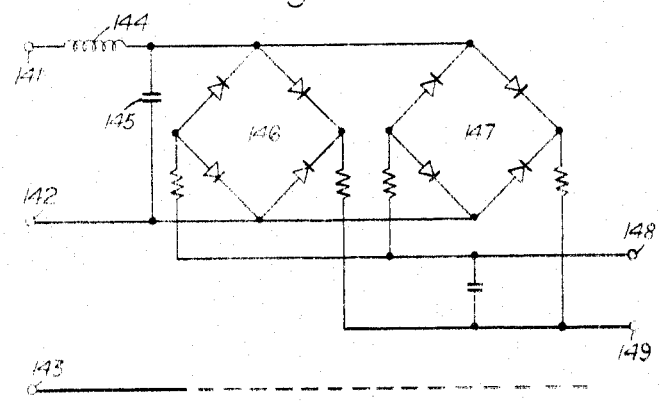
Figure 17:
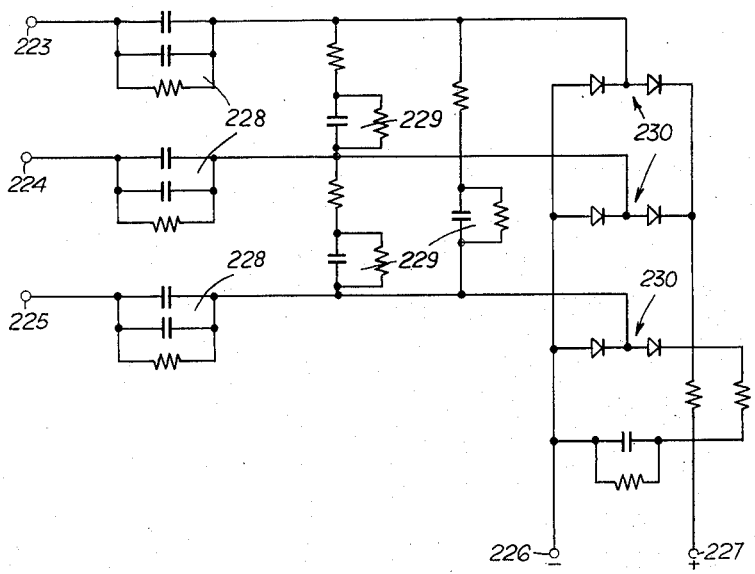
Figure 18:
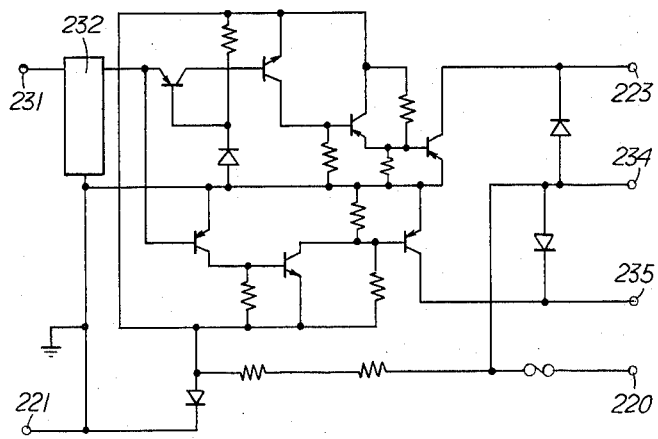

FIGURE 2 is an elevation on an enlarged scale of control equipment shown in FIGURE 1, with the lid of a casing for the equipment removed, FIGURE 3 is an elevation, in the direction of the arrow III in FIGURE 2, with the casing partly broken away and with the lid in position, FIGURE 4 is a circuit diagram of the apparatus shown in FIGURES 1–3, FIGURE 5 is a plan of apparatus for measuring the length of paper tape, FIGURE 6 is a sectional elevation on the line VI—VI in FIGURE 5, FIGURE 7 is a plan view in the direction VII of the part of the apparatus shown in FIGURE 6, FIGURE 8 is a circuit diagram of the apparatus shown in FIGURE 5, FIGURE 9 is a circuit diagram of an amplifier incorporating its own power supply unit and forming part of the circuit shown in FIGURE 8, FIGURE 10 is a constant current supply unit incorporated in the circuit shown in FIGURE 8, FIGURE 11 is a simplified elevation partly in section of one lapping head of a machine for applying paper tapes to an electric cable, FIGURE 12 is a simplified end elevation in the direction indicated by the arrow XII in FIGURE 11, partly sectioned on the line XII—XII, FIGURE 13 is an enlarged side elevation of control apparatus forming part of the head shown in FIGURE 11, FIGURE 14 is a partly sectioned end elevation in the direction of the arrow XIV in FIGURE 13, FIGURE 15 is a plan, partly in section, of part of the apparatus shown in FIGURE 13, FIGURE 16 is a simplified circuit digram of the apparatus shown in FIGURES 11–15, FIGURE 17 is a circuit diagram of a constant current supply source, and FIGURE 18 is a circuit diagram of an amplifier included in the circuit shown in FIGURE 16.

The wire drawing apparatus shown in FIGURE 1 is for drawing copper to a diameter of approximately 0.002 inch (0.05 mm.) and is of the kind in which the wire passes backwards and forwards over pairs of blocks such as 1, each of which comprises a series of capstans of different diameter, through a series of dies of different diameter mounted in a casing 2. After being drawn to the required diameter the wire passes from the largest diameter capstans 3 of the block 1 over guide pulleys 4, through tension control apparatus shown in greater detail in FIGURES 2 and 3 on to the take-up spool 5 driven by a reversible motor 6. In its passage from the pulleys 4 to the take-up spool 5, the wire passes over the inner pulley 7 of a pair of pulleys 7 and 8 mounted on a fixed spindle carried on the lid 9 of the casing of the control apparatus, downwards around a jockey pulley 10, upwards from the pulley 10 over the pulley 8 and then on to the take-up spool 5.

The pulley 10 is free to rotate about a spindle 11 carried on a pivoted arm 12 and the reaction of the tension in the wire on the arm 12 is balanced by a tension spring 13. The arm 12 carries a shutter 14, the shape of which is shown in FIGURE 3, and this shutter is located in a curved passage formed by the space between two metal blocks 15 and 16. In a pair of parallel bores in the block 15 are mounted two photo-transistors 17 and 18 and these two bores are continuous with parallel bores in the block 16 which accommodate a pair of electric lamps 19 and 20.

It will be seen that movement of the jockey pulley 10 towards the pair of pulleys 7 and 8 decreases the amount of light reaching the photo-transistor 17 from the lamp 19 and movement of the pulley 10 away from the pair of pulleys 7 and 8 decreases the amount of light reaching the photo-transistor from the lamp 20. The spindle 11 for the pulley 10 moves in a slot in the lid 9 (shown dotted at 21 in FIGURE 2) and the arm 12 can move downwards through a slot 22 in the lower wall of the casing.

If the wire breaks or if the tension falls to a dangerously low level the arm 12 will move into a position in which an integral lug 23 strikes an operating arm 24 of a microswitch 25. This switch is incorporated in the power supply to the take-up motor 6 in such a way as to stop the motor when the wire breaks. The motor 6 drives the spool 5 through a belt 27 and pulley 28.

The tension in the spring 13 can be pre-set by rotating the knob 30 which winds up a flexible extension 31 of the spring 13 on to a shaft 32. The pre-set tension is indicated by a point 29 which is attached to a block 34 forming the junction between the spring 13 and the flexible extension 31. The spring 13 is coupled to the arm 12 in such a way that whatever the position of the jockey pulley 10 it exerts a substantially constant tensile force on the wire accumulated between it and the pulleys 7 and 8.

Electrical leads pass from the photo-transistors 17, 18 through a conduit to an amplifier, comprising a pre-amplifier and power amplifier, the circuit of which is shown in FIGURE 4. Power supply leads to the lamps 19 and 20 and the leads to the switch 25 pass through the same conduit.

Referring to FIGURE 4, the photo-transistors 17 and 18 are coupled through a resistor network to the input of the amplifier which is a transistor amplifier. Leads 36 and 37 supply power to the pre-amplifier at −12 volts and +12 volts respectively. The power supply to the power amplifier is at −30 volts through the lead 38. Connected in the input of the amplifier is a resistance capacitance stabilising network 39 which will be described in more detail later. The amplifier is a multi-stage amplifier with a power gain of $6 \times 10^6$ in which the pre-amplifier comprises the transistors 41, 42 and 43 and the power amplifier comprises the transistors 44–48. The amplifier has two outputs, one supplied by the transistors 44–46 and the other supplied by the transistors 47 and 48.

The three output terminals 49, 50 and 51 of the amplifier are connected to the field windings 52 and 53 of the motor 6 which is a split field D.C. motor of 1.5 horsepower. The armature 54 of the motor is provided with a substantially constant current supply derived from 415 volt three phase mains terminals 55, 56 and 57 through a full wave rectifier comprising three pairs of rectifiers 58, 59 and 60, current limiting capacitors 61, 62 and 63, and surge suppression networks 64, 65 and 66.

Any decrease in tension of the wire will cause the arm 12 to move downwards to decrease the amount of light reaching the photo-transistor 18 thus increasing the input to the upper part of the amplifier and hence increasing the field current in the part 52 of the field winding of the motor 6. This will increase the motor torque and tend to restore the set tension.

Similarly increase in tension in the wire will reduce the current in part 52 of the winding and eventually if the tension rises sufficiently, will cause the lower part of the amplifier to pass current through the lower half 53 of the winding and reverse the motor torque again tending to restore the set tension.

A sufficient length of wire can accumulate between the pulleys 7, 8 and 10 to compensate for any delay in the response of the motor 6 to changes in speed of the wire.

The stabilising circuit 39 comprises capacitors 55 and 56 and resistors 57 and 58 of values calculated by synthesis from the mechanical and electrical constants of the system in accordance with well established methods.

A similar tension control apparatus can be used for taking up other light flexible materials on a drum from a supply source, e.g. enamelled wire from an enamelling machine, polyethylene covered wire from an extruder, thin paper and metal foil in a capacitor winding machine and magnetic tape on to a storage spool.

The second example of apparatus in accordance with the invention to be described is a machine for accurately measuring the length of paper tape while winding the tape at constant tension on to a take-up spool.

Referring to FIGURE 5, paper tape 60 passes from a supply spool 61, around guide pulleys 62 and 63 and a jockey pulley 64, on to a capstan 65. From the capstan 65 the tape 60 passes, around guide pulleys 66 and 67 and a jockey pulley 68, on to a take-up spool 69. The jockey pulleys 64 and 68 each move against a substantially constant biasing force in accordance with changes in tension of the tape 60 in a manner which will be described with reference to FIGURES 6 and 7.

From FIGURES 6 and 7 it will be seen that the jockey pulley 68 is carried on and is free to rotate with respect to a spindle 70 which passes through one of two slots 71, 72 (FIGURE 5) in a deck 73 supporting the spools 61 and 69 and the capstan 65 and ancillary apparatus. The spindle 70 is carried on a pivoted arm 74 mounted on and attached to a spindle 75 which is free to rotate in a bracket 76 mounted beneath the deck 73. FIGURE 7 is a plan of the assembly carried by the bracket 76, removed from the deck 73. The spindle 75 is coupled by a universal coupling 77 to the operating spindle 78 of a potentiometer mounted in a casing 79, also supported on the bracket 76.

The reaction of the tape on the jockey pulley 68 is opposed by a tension spring 80 which extends between an adjustable support 81 mounted on the bracket 76 and a rigid arm 82 extending at right angles from the arm 74. The arrangement is such that as the jockey pulley 68 moves within the limits allowed by the length of the slot 72 in the deck 73, the spring 80 causes the pulley 68 to exert a substantially constant tensile force on the lengths 83 and 84 of the tape 60 accumulated between the jockey pulley 68 and the guide pulleys 66 and 67 respectively.

The supply spool 61 is driven by a one-eighth horsepower reversible split field motor 85 mounted beneath the deck 73 and the take-up spool 69 is driven by a similar reversible motor 86. The capstan 65 is driven by a one-eighth horsepower variable speed D.C. motor 87, its speed being variable under the control of a motor driven variable transformer 88. The capstan 65 is coupled to a conventional decade counter energised by a digitiser disc (not shown), mounted on the capstan shaft.

Referring now to the circuit diagram in FIGURE 8, the apparatus is connected to 240 volt single phase power supply mains 91, 92 and 93 consisting of line, neutral and earth respectively. The mains supply leads are connected through a control panel 94 to two constant current supply units 95 and 96, two D.C. amplifiers 97 and 98, the variable transformer 88, the decade counter 99 and a power unit 100 for the capstan motor 87.

Field current for the supply and take-up spool motors 85 and 86 is derived from the D.C. amplifiers 97 and 98 respectively and the armature current for these motors is derived from the constant current supply units 95 and 96.

The decade counter 99 is used primarily for measuring the length of the tape wound from the supply spool 61 on to the take-up spool 69 but it also supplies signals to the variable transformer 88 for accelerating and decelerating the capstan motor 65 at the beginning and end of the winding operation and supplies signals direct to the power unit 100 of the capstan motor 87 for starting and stopping this motor.

Two potentiometers 101 and 102 controlled by the jockey pulleys 64 and 68 (such as that mounted in the casing 79 shown in FIGURE 6) are connected in the input circuits of the D.C. amplifiers 97 and 98 in a manner that will now be described with reference to the circuit diagram forming FIGURE 9.

Referring to FIGURE 9, power input terminals 103, 104 and 105 for the D.C. amplifier and potentiometer are connected respectively to the leads 91, 92 and 93. One secondary winding 106 of a power transformer 107 is connected through terminals 108 and 109 to the fixed terminals of the potentiometer, the moving contact of the potentiometer being connected to a terminal 110 of the amplifier. An adjustable potential divider connected across the terminals 108, 109, and consisting of a fixed resistor 108a and a potentiometer type rheostat 109a with its moving contact earthed, ensures that the terminal 108 is always positive with respect to earth and that the terminal 109 is always negative with respect to earth. Another secondary winding 111 of the transformer 107 provides power for the D.C. amplifier through a full wave rectifier 112.

Connected in the input of the amplifier is a stabilising circuit 114 similar to that shown in FIGURE 4.

The amplifier has a power gain of $6 \times 10^6$ and can be considered as consisting of two parts, an upper part of four stages comprising the transistors 121, 122, 123 and 124 providing an output across terminals 128 and 129 and the other (lower) part comprising transistors 125, 126 and 127 providing an output across terminals 129 and 130. Commutating diodes 131 and 132 are connected across the output terminals. The function of the transistor 121 is to enable one input terminal 113 to be earthed in order to reduce stray pick-up of random noise signals and also to ensure that the first (upper part) of the amplifiers only accepts positive input signals. It will be seen that the "inverter" transistor 121, which is of the PNP type, is connected in the grounded base configuration so that it will only conduct (and thus provide an input signal for the transistor 122 forming the first stage of the upper channel of the amplifier) when its emitter is positive with respect to its base, which is earthed. Transistor 125, which is also of the PNP type and forms the first stage of the lower channel of the amplifier is connected in the grounded emitter configuration so that it will only conduct (and thus provide an input signal to the second stage transistor 126) when its base is negative with respect to its emitter, which is earthed. The emitter of transistor 121 and the base of transistor 125 are connected together and, through the network 114, to the terminal 110 and hence to the moving contact of the potentiometer (101 or 102). Thus when the moving contact is positive, transistor 121 will conduct and there will be an output across the terminals 128, 129, and when the moving contact is negative, there will be an output across the terminals 129, 130.

One of the field windings of the split field motor (85 or 86) is connected across the output terminals 128 and 129 and the other field winding is connected across the output terminals 129 and 130.

FIGURE 10 is the circuit diagram of the constant current supply units 95 and 96. The input terminals 141 and 142 and the earth terminal 143 of the unit are connected to the supply leads 91, 92 and 93 respectively. The earth terminal 143 of the unit is connected to the metallic chassis of the unit, as indicated in FIGURE 10 by a dotted line. The unit is of conventional form comprising a choke 144 and surge suppression capacitor 145 and two groups, 146 and 147, of four rectifiers supplying substantially constant current to the output terminals 148 and 149, which are connected to the armature winding of one of the split field reversible motors (85 and 86).

In order to obtain a precise measurement of the length of tape passing from the spool 61 to the spool 69, the tape must be transported by the capstan 65 without slip and to achieve this the tension of the tape on both sides of the capstan should be substantially the same. The capstan 65 is of accurately machined circumference. The biasing springs (such as 80) for the jockey pulleys 64 and 68 are initially set to provide substantially equal tension in the length of tape between the supply spool 61 and the capstan 65 to that in the length of tape between the capstan 65 and the take-up spool 69 and any tendency for this tension to vary during the running of the apparatus will cause the torque applied to the spools 61 and 69 by the motors 85 and 86 to vary in a similar manner to that described with reference to FIGURES 1–4.

The third example of apparatus in accordance with the invention to be described is a lapping head for simultaneously applying twelve dielectric paper tapes to an electric cable. The lapping machine is basically of conventional construction and only those constructional features essential to the understanding of the tension control arrangement will be described.

Referring to FIGURES 11 and 12, the main parts of the head are two hollow shafts 161 and 162 between which are mounted twelve plates each carrying a spool and associated equipment for one pad of paper. The hollow shaft 161 runs in a bearing 163 carried in a main supporting trunnion 164 and is driven from a main driving shaft 165, coupling all of the heads of the paper lapping machine, through a gear train, of which one pinion 166 meshing with a ring pinion 167 mounted on the hollow shaft 161 can be seen. The hollow shaft 161 also supports on a ring 168 a series of seven slip rings, generally indicated as 169. The hollow shaft 162 runs freely in bearings 170 carried in a second main supporting trunnion 171.

The cable core 172 passes axially through the two hollow shafts and is guided by a series of guide rolls of which only two 173 and 174, supported on a frame 175, are shown.

Each of the hollow shafts 161 and 162 carries a series of six radially projecting Y-shaped brackets 176 of which, for the sake of simplicity, only one pair is shown in FIGURE 11. The apparatus supported by each pair of the Y brackets is identical; only one set will be described and similar parts of similar sets will, where appropriate, be given the same references in the drawings. Bridging each pair of Y brackets 176 is a pair of identical plates 177 and 178 each supporting a pad of paper, shown chain dotted at 179 in FIGURES 11 and 12. Only one pair of plates 177, 178 is shown in FIGURE 12.

Each pad 179 is driven by a 0.27 horsepower reversible split field electric motor 180 through a train of gears including a pinion, mounted on the motor shaft, meshing with a pinion 181 mounted on the same shaft as a smaller pinion meshing with a pinion 182 on the pad shaft. The field supply for the motor is obtained from an amplifier 183 which will be described in greater detail later. In order to accommodate two motors 180 between each pair of plates 177, 178 the motors are mounted at opposite ends of the plates and each protrudes into a semi-circular aperture in the other plate, see FIGURE 11.

From the pad 179 each paper tape 184 passes through a hollow shaft 185, located in an aperture in a flange 186 on the hollow shaft 162, to a sensing device generally indicated as 187 in FIGURES 11 and 12 (in the latter figure for the sake of simplicity many details of the sensing device have been omitted, full details of the device being shown in FIGURES 13–15). From the sensing device 187 the tape 184 passes on to the cable core 172.

The base plate 188 of the sensing device is supported on a ring 189 carried on the end of the shaft 185. A toothed quadrant 190 projecting from the ring meshes with a toothed ring 191 supported co-axially within the hollow shaft 162. Means are provided for finely adjusting the axial position of the ring 191 with respect to the hollow shaft 162 and locking it in the position to which it is adjusted. This adjustment causes the base plates 188 of all of the twelve sensing devices simultaneously to rock about the axes of the hollow shafts 185 and thus to vary the angle of approach of the tape to the cable.

Referring now to FIGURES 13–15, the base plate 188 carries a series of guide rollers 192–196 for the tape 184 and a jockey roller 197 is carried on a pivoted arm 198 (see also FIGURE 12). The arm 198 forms part of an assembly generally indicated as 199 in FIGURE 15, which assembly passes through an aperture in the base plate 188 and is secured to the base plate by screws.

Referring to FIGURE 15, it will be seen that the arm 198 is carried on a spindle 200 supported in bearings in the main frame 201 of the assembly 199 and carrying at one end an arm 202 which supports at its free end a wiper contact of a potentiometer 203. The arm 198 is biased by a pair of tension springs 204 to move in a direction opposite to that in which it is urged by the paper tape 184. The springs 204 are so coupled to the arm 198 that the jockey roller 197 exerts a substantially constant force on the paper tape accumulated between it and the rollers 193 and 194.

The spindle 200 also carries a second arm (not visible in the drawings) which actuates a change over switch when the arm is rotated to its maximum extent in a clockwise direction (FIGURE 13), as when the paper tape 184 breaks or its tension falls to a dangerously low value. The tension in the springs 204 can be adjusted by moving a bracket 205, which slides in a slot in the base plate 188, by means of an adjusting screw 206. The potentiometer 203 and micro-switch and their electrical connections are enclosed within a casing 207 forming part of the assembly 199.

Referring now to the circuit diagram in FIGURE 16, the seven slip rings generally indicated by 169 in FIGURE 11 are indicated as 211–217 in FIGURE 16. The first two slip rings, 211 and 212, are connected in series to the armatures 218 of the twelve motors 180, the corresponding pick-up brushes (not shown) being connected to a substantially constant current source which will be described in more detail with reference to FIGURE 17.

The two slip rings 213, 214 are connected through change-over switches 219 to the input terminals 220, 221 of the amplifiers 183, the three output terminals of the amplifier being connected to the split field windings such as 222 of the motors 180. These are the change-over switches referred to in the description of FIGURE 15. The pick-up brushes corresponding to the slip rings 213 and 214 are connected to a common power source for the amplifiers.

The slip ring 215 is connected to the lower fixed contacts of the change-over switches 219 and the corresponding pick-up brush is connected to an alarm circuit which indicates when any one of these switches changes over to its lower position, to indicate breakage of a paper tape or severe loss of tension in the tape.

The slip rings 216 and 217 are connected in parallel to the twelve potentiometers 203 (see also FIGURE 15), the wiping contacts of these potentiometers being connected to the amplifiers 183 in a manner that will be described in more detail with reference to FIGURE 18. The pick-up brushes corresponding to the slip rings 216 and 217 are connected to a suitable power supply source for the potentiometers.

For simplicity only three armatures, amplifiers, two way switches and potentiometers are shown in FIGURE 16 although it will be appreciated that there are twelve of each, one of each of which is associated with each paper pad 179. Also, the one of each of these components to the left of the chain dotted line is shown in greater detail than are the remainder.

Referring now to FIGURE 17 the constant current supply source is of conventional design having input terminals 223, 224 and 225 connected to a three phase 440 volt A.C. mains supply and output terminals 226 and 227 connected to pick-up brushes for the slip rings 211 and 212. The circuit comprises three series current limiting networks 228, three parallel surge suppression networks 229 and three pairs of rectifiers 230, giving full wave rectification.

Referring to FIGURE 18, the amplifier circuit is similar to that described with reference to FIGURE 9 differing principally in that it does not incorporate its own power supply unit. As mentioned above, a common power supply unit for all of the amplifiers is provided and this unit is connected across the pick-up brushes corresponding to the slip rings 213 and 214. In FIGURE 18 the power input terminals of the amplifier are shown at 221 and 220 and the input terminal connected to the moving contact of the potentiometer 203 is indicated as 231. As in the previous example, the input to the amplifier incorporates a stabilising network 232, a suitable network consisting of two capacitors and two resistors connected in bridged-T configuration as shown in FIGURE 4. The output terminals of the amplifier to which the split field winding of the motor 180 is connected are 233, 234 and 235.

Before commencing a lapping operation, the twelve adjusting screws 206 on the sensing devices are set to provide the desired tension in the paper tapes and during running of the machine any variation in tension of one of the tapes from the desired value will cause one of the arms 198 to move and adjust the corresponding potentiometer 203 in the input of the corresponding amplifier 183. This will cause an appropriate variation in the output torque of the motor 180 associated with the pad 179 from which the tape is being withdrawn to restore the tension to the desired value.

All three forms of apparatus described limit the changes in tension in the flexible material to a very small range since any change in speed of the flexible material brings about an immediate change in the amount of material accumulated by the sensing device, whereupon the consequent movement of the jockey pulley adjusts the torque of the reversible motor.

What I claim as my invention is:

1. Apparatus for maintaining a substantially constant tension in flexible material as it passes between means for driving the flexible material and a drum comprising:
   (a) a drum for carrying a plurality of turns of the flexible material wound thereon,
   (b) a reversible electric motor coupled to the drum in such a way as to provide substantially the sole driving means for the drum,
   (c) means for driving the flexible material, capable of exerting a greater longitudinal force thereon than the reversible motor and the drum,
   (d) a sensing device responsive to changes in tension of the flexible material in its path between the drum and the means for driving the flexible material,
   (e) a variable resistance coupled to the sensing device in such a way that variations in the response of said device vary the value of the resistance,
   (f) means for establishing a potential difference across said resistance,
   (g) a multi-stage high gain D.C. amplifier consisting essentially of a succession of transistor amplifying stages connected in cascade having the variable resistance in the input circuit of the first of said stages and having the output circuit of the last of said stages connected to the reversible motor to supply substantially the whole current for at least one element of the motor, the elements consisting of the armature and field, to drive the motor in one direction when the variable resistance is above a predetermined value and in the reverse direction when it is below said value, with a torque dependent on the value of said resistance,
   (h) a power supply for said amplifier, and
   (i) a resistance/capacitance stabilisation network, designed to inhibit hunting in the system, connected in the input circuit of the first of said amplifier stages.

2. Apparatus as claimed in claim 1 in which one input terminal of the amplifier is earthed.

3. Apparatus as claimed in claim 1 in which the power gain of the amplifier is above $10^3$.

4. Apparatus as claimed in claim 1 in which the power gain of the amplifier is above $10^6$.

5. Apparatus as claimed in claim 1 in which the sensing device is capable of accumulating a length of the flexible material sufficient to compensate for any delay in the response of the reversible motor and in which the sensing device is so designed that it applies a substantially constant force to the flexible material, whatever the amount accumulated by it within predetermined limits.

6. Apparatus as claimed in claim 1 in which the sensing device comprises a jockey pulley acted upon by a loop of the flexible material, in its path between the drum and the means for driving the flexible material, and by a substantially constant biasing force opposing the tension in the flexible material, which device varies, in accordance with the movement of the jockey pulley, the value of the resistance controlling the amplifier input.

7. Apparatus as claimed in claim 6 in which a phototransistor is connected in the input circuit of the amplifier to constitute said resistance and in which the jockey pulley is mounted on a movable member which actuates a shutter to vary the amount of light falling on the phototransistor, and hence its resistance.

8. Apparatus as claimed in claim 1 in which
   (a) the amplifier supplies the whole of the field current for the reversible motor, and
   (b) the apparatus comprises a substantially constant current power supply which supplies the whole of the armature current of the reversible motor.

9. Apparatus as claimed in claim 8 in which
   (a) the reversible motor is a split field motor, and
   (b) the amplifier has two output circuits one of which supplies current to one part of the motor field to drive the motor in one direction when the variable resistance is above the predetermined value and the other of which supplies current to the other part of the motor field to drive the motor in the reverse direction when the resistance is below the predetermined value.

10. A lapping head for applying a flexible insulating tape to an electric conductor comprising
   (a) means for rotating a pad of said tape around said conductor,
   (b) means for guiding said tape from the pad on to the conductor, and
   (c) a reversible electric motor coupled to the pad in such a way as to drive the pad,
   (d) a sensing device responsive to changes in tension of the insulating tape in its path between the pad and the conductor,
   (e) a variable resistance coupled to the sensing device in such a way that variations in the response of said device vary the value of the resistance,
   (f) a multi-stage high gain D.C. amplifier consisting essentially of a succession of transistor amplifying stages connected in cascade having the variable resistance in the input circuit of the first of said stages and having the output circuit of the last of said stages connected to the reversible motor to supply substantially the whole current for at least one element of the motor, the elements consisting of the armature and field, to drive the motor in one direction when the variable resistance is above a predetermined value and in the reverse direction when it is below said value, with a torque dependent on the value of said resistance, and (g) a resistance/capacitance stabilisation network, designed to inhibit hunting in the system, connected in the input circuit of the first of said amplifier stages.

11. Apparatus as claimed in claim 10 for simultaneously applying a plurality of tapes to the conductor from a plurality of supply pads, in which each pad is driven by a separate reversible electric motor associated with an amplifier and a sensing device responsive to changes in tension in the tape passing from the pad on to the conductor.

12. Apparatus as claimed in claim 11 in which each amplifier supplies the field current to the motor with which it is associated and the armature current for all of the motors is derived from a common source of supply.

References Cited by the Examiner
UNITED STATES PATENTS

| | | | |
|---|---|---|---|
| 2,353,639 | 7/1944 | Berthold et al. | 242—45 |
| 2,449,797 | 9/1948 | Waldie | 318—257 |
| 2,904,275 | 9/1959 | Selsted et al. | 242—55.12 |
| 2,981,491 | 4/1961 | Eans | 242—45 |
| 3,006,136 | 10/1961 | Grieve et al. | 57—3 |
| 3,105,179 | 9/1963 | Young et al. | 242—75.51 X |

STANLEY N. GILREATH, *Primary Examiner.*

MERVIN STEIN, *Examiner.*